United States Patent
Toyota et al.

(10) Patent No.: US 9,800,331 B2
(45) Date of Patent: Oct. 24, 2017

(54) OPTICAL TRANSMISSION APPARATUS AND LEVEL ADJUSTING METHOD

(71) Applicant: FUJITSU LIMITED, Kawasaki-shi, Kanagawa (JP)

(72) Inventors: Yuichi Toyota, Fukuoka (JP); Akihiro Mukai, Fukuoka (JP); Daisuke Kobayashi, Kasuya (JP); Tatsuo Nagayoshi, Ohnojyou (JP); Haruki Tanaka, Itoshima (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/079,964

(22) Filed: Mar. 24, 2016

(65) Prior Publication Data
US 2016/0315700 A1    Oct. 27, 2016

(30) Foreign Application Priority Data
Apr. 24, 2015    (JP) .................. 2015-089797

(51) Int. Cl.
*H04J 14/02*    (2006.01)
*H04B 10/079*    (2013.01)
*H04B 10/572*    (2013.01)

(52) U.S. Cl.
CPC ..... *H04B 10/07955* (2013.01); *H04B 10/572* (2013.01); *H04J 14/0221* (2013.01)

(58) Field of Classification Search
CPC ............ H04B 10/07955; H04B 10/572; H04J 14/0221
See application file for complete search history.

(56) References Cited

U.S. PATENT DOCUMENTS

| | | | | |
|---|---|---|---|---|
| 7,305,188 B2* | 12/2007 | Yamashita | .......... | H04J 14/0212 398/79 |
| 2006/0013585 A1* | 1/2006 | Hnatiw | .................... | G01J 3/28 398/38 |
| 2006/0039703 A1* | 2/2006 | Katagiri | .......... | H04B 10/25133 398/147 |
| 2008/0074731 A1* | 3/2008 | Takeyama | .......... | H01S 3/06758 359/333 |
| 2015/0132009 A1* | 5/2015 | Yuki | .................. | H04J 14/0212 398/135 |

FOREIGN PATENT DOCUMENTS

| | | |
|---|---|---|
| JP | 2012-147151 | 8/2012 |
| JP | 2014-7564 | 1/2014 |

* cited by examiner

*Primary Examiner* — Dzung Tran
(74) *Attorney, Agent, or Firm* — Fujitsu Patent Center

(57) ABSTRACT

An optical transmission apparatus includes: a wavelength selecting switch, including an input port and an output port having more ports than the input port, configured to perform an adjustment of a level of an optical signal from the input port to the output port; a first monitor configured to monitor the level of the optical signal at the input port unit; a second monitor configured to monitor the level of the optical signal at the output port unit; and a controller configured to control the wavelength selecting switch wherein the controller: calculates a virtual output value for the output port unit based on a first monitor result from the first monitoring unit, a second monitor result from the second monitoring unit, and a current adjustment value for the adjustment function; calculates a new adjustment value based on the virtual output value; and sets the new adjustment value to the adjustment.

12 Claims, 6 Drawing Sheets

OPTICAL TRANSMISSION APPARATUS AND LEVEL ADJUSTING METHOD

CROSS-REFERENCE TO RELATED APPLICATION

This application is based upon and claims the benefit of priority of the prior Japanese Patent Application No. 2015-089797, filed on Apr. 24, 2015, the entire contents of which are incorporated herein by reference.

FIELD

The embodiments discussed herein are related to an optical transmission apparatus and a level adjusting method.

BACKGROUND

In an optical wavelength division multiplex (WDM) transmission system, multiple optical transmission apparatuses are coupled to one another, and an optical wavelength multiplex signal obtained by multiplexing optical signals having different light wavelengths is transmitted among the optical transmission apparatuses.

The related art is disclosed in Japanese Laid-open Patent Publication No. 2014-7564 and Japanese Laid-open Patent Publication No. 2012-147151.

SUMMARY

According to an aspect of the embodiments, an optical transmission apparatus includes: a wavelength selecting switch, including an input port and an output port having more ports than the input port, configured to perform an adjustment of a level of an optical signal which is output from the input port to the output port; a first monitor configured to monitor the level of the optical signal at the input port unit; a second monitor configured to monitor the level of the optical signal at the output port unit; and a controller configured to control the wavelength selecting switch, the first monitor, and the second monitor, wherein the controller is configured to: calculate a virtual output value for the output port unit based on a first monitor result from the first monitoring unit, a second monitor result from the second monitoring unit, and a current adjustment value for the adjustment function; calculate a new adjustment value for the adjustment based on the virtual output value; and set the new adjustment value to the adjustment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An optical transmission apparatus includes a wavelength selective switch (WSS) which drops/adds an optical signal having any light wavelength, from/to an optical wavelength multiplex signal.

In the WSS, a feedback (FB) control system which monitors the output power of the WSS and which makes adjustment based on the output monitor value so that the optical output level reaches the target level is employed as a control system for keeping the optical output level stable.

For example, an optical transmission apparatus has a tendency to have an increasing number of output ports and an increasing number of monitoring points which are caused by an extension of the number of light paths or the like. Employment of a FB control system causes an increase in a control period in which the optical output level is controlled. As a result, the optical-output-level control in a WSS may fail to follow a change in the optical power level on a transmission path at high speed, resulting in failure to attain stable output in the WSS.

In an optical transmission apparatus, an increase in the number of output ports causes an increase in the number of operations of branching an optical wavelength multiplex signal which has been received, into multiple output ports. For example, when an optical wavelength multiplex signal is output to five output ports, an optical channel monitor (OCM) is used to sequentially measure the power of the optical signal in each of the output ports for five wavelengths. One cycle of the measurement for the five output ports takes time. Therefore, if the optical power level on a transmission path changes during the measurement time, the optical-output-level control in a WSS may fail to follow the change in the optical power level, resulting in failure to attain stable output in the WSS.

Embodiments described below do not limit the disclosed technique. The embodiments described below may be combined with one another as appropriate.

Figure 1:
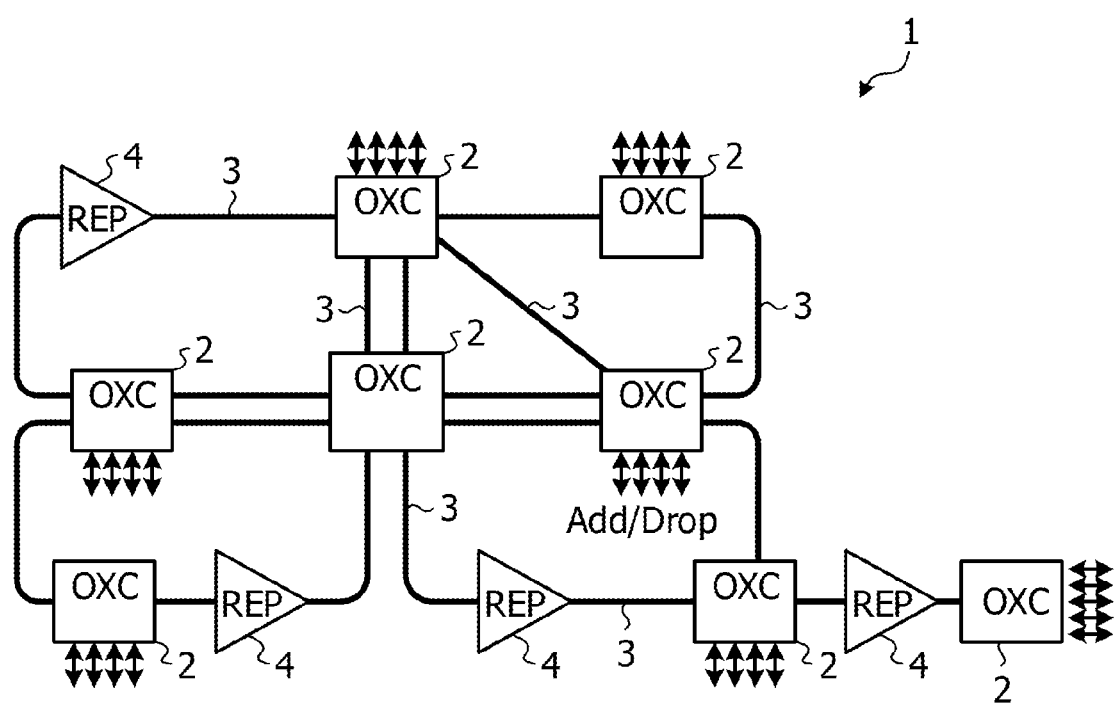
FIG. 1 illustrates an exemplary optical transmission system.

FIG. 1 illustrates an exemplary optical transmission system. In the optical transmission system 1 illustrated in FIG. 1, multiple optical cross-connects (OXCs) 2 are mesh-connected by using optical fibers 3. Each of the OXCs 2 multiplexes optical signals having different light wavelengths so as to transmit the optical wavelength multiplex signal according to the WDM method to optical fibers 3. The OXC 2 includes a WSS which drops/adds an optical signal having any wavelength, from/to the optical wavelength multiplex signal. The OXC 2 has an 8-degree configuration at most. The optical transmission system 1 includes multiple intermediate repeaters (REPs) 4 on the optical fibers 3. Each of the REPs 4 is a repeater which amplifies the optical wavelength multiplex signal on an optical fiber 3 so as to transmit the amplified signal as a relay output.

Figure 2:
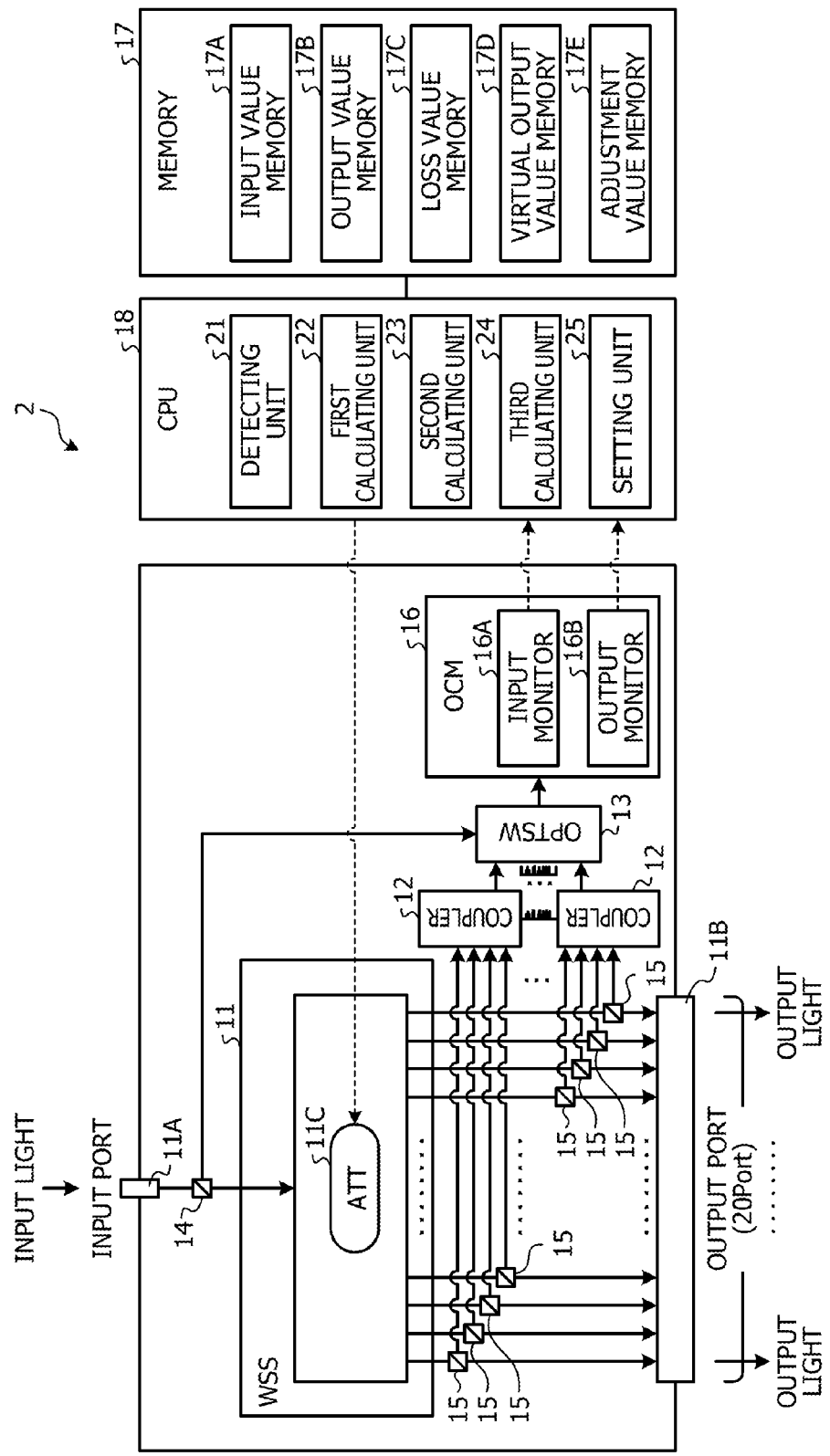
FIG. 2 illustrates an exemplary optical cross-connect (OXC)

FIG. 2 illustrates an exemplary OXC. The OXC 2 illustrated in FIG. 2 includes a WSS 11, couplers 12, an optical switch (OPTSW) 13, a first optical branching unit 14, second optical branching units 15, an OCM 16, a memory 17, and a central processor unit (CPU) 18. The WSS 11 has N input ports 11A, M output ports 11B, and an attenuator (ATT) 11C. The WSS 11 outputs each optical signal included in an optical wavelength multiplex signal in a corresponding light wavelength unit, from the input ports 11A to a corresponding one of the output ports 11B. The input ports 11A is constituted by N ports, each of which receives an optical signal such as an optical wavelength multiplex signal, and, for example, may be constituted by one port. The output ports 11B is constituted by M ports, each of which outputs a signal having a corresponding light wavelength, and, for example, may be constituted by 20 ports. The number of input ports 11A and the number of output ports 11B may be changed as appropriate. For the number of input ports 11A and the number of output ports 11B, N<M holds where N and M are natural numbers.

Each of the couplers 12 adds optical signals transmitted to, for example, four ports of the output ports 11B. For example, when the output ports 11B are constituted by 20 ports, each of the couplers 12 adds optical signals for four ports of the output ports 11B, and the number of couplers 12 may therefore be five. The number of output ports 11B and the number of couplers 12 may be changed as appropriate.

The OPTSW 13 switches an optical signal that is to be monitored by the OCM 16, and outputs the optical signal. The optical signal to be monitored may be an optical signal on the input port 11A side which is branched at the first optical branching unit 14, or may be an optical signal on the output ports 11B side which is obtained through branching at the second optical branching units 15. The OPTSW 13 performs switching between an optical signal on the output ports 11B side which is obtained through branching at the second optical branching units 15 and which is transmitted from a corresponding one of the couplers 12, and an optical signal on the input port 11A side which is branched at the first optical branching unit 14, and outputs the signal to the OCM 16. The first optical branching unit 14 branches an optical signal transmitted from the input port 11A. Each of the second optical branching units 15 is disposed for a corresponding one of the output ports 11B, and branches an optical signal transmitted to the output port 11B.

The OCM 16 which includes an input monitor 16A and an output monitor 16B may be, for example, an optical spectrum analyzer. Based on an optical signal which passes through the input port 11A and which is obtained through branching at the first optical branching unit 14, the input monitor 16A monitors the signal power of the optical signal from the input port 11A of the WSS 11, and obtains an input monitor value. Based on optical signals which pass through the output ports 11B and which are obtained through branching at the second optical branching units 15, the output monitor 16B monitors the signal power of the optical signals transmitted to the output ports 11B of the WSS 11, and obtains output monitor values.

The ATT 11C of the WSS 11 adjusts the output level based on an adjustment value so that the output of the optical signal for each light wavelength which is output from the input port 11A to a corresponding one of the output ports 11B is stable. The memory 17 is an area in which various types of information are stored. The memory 17 may include an input value memory 17A, an output value memory 17B, a loss value memory 17C, a virtual output value memory 17D, and an adjustment value memory 17E.

The input value memory 17A may be an area in which input monitor values obtained by the input monitor 16A are stored. The output value memory 17B may be an area in which output monitor values obtained by the output monitor 16B are stored. The loss value memory 17C may be an area in which optical loss values are stored. The virtual output value memory 17D may be an area in which virtual output monitor values are stored. The adjustment value memory 17E may be an area in which adjustment values are stored.

Figure 3:
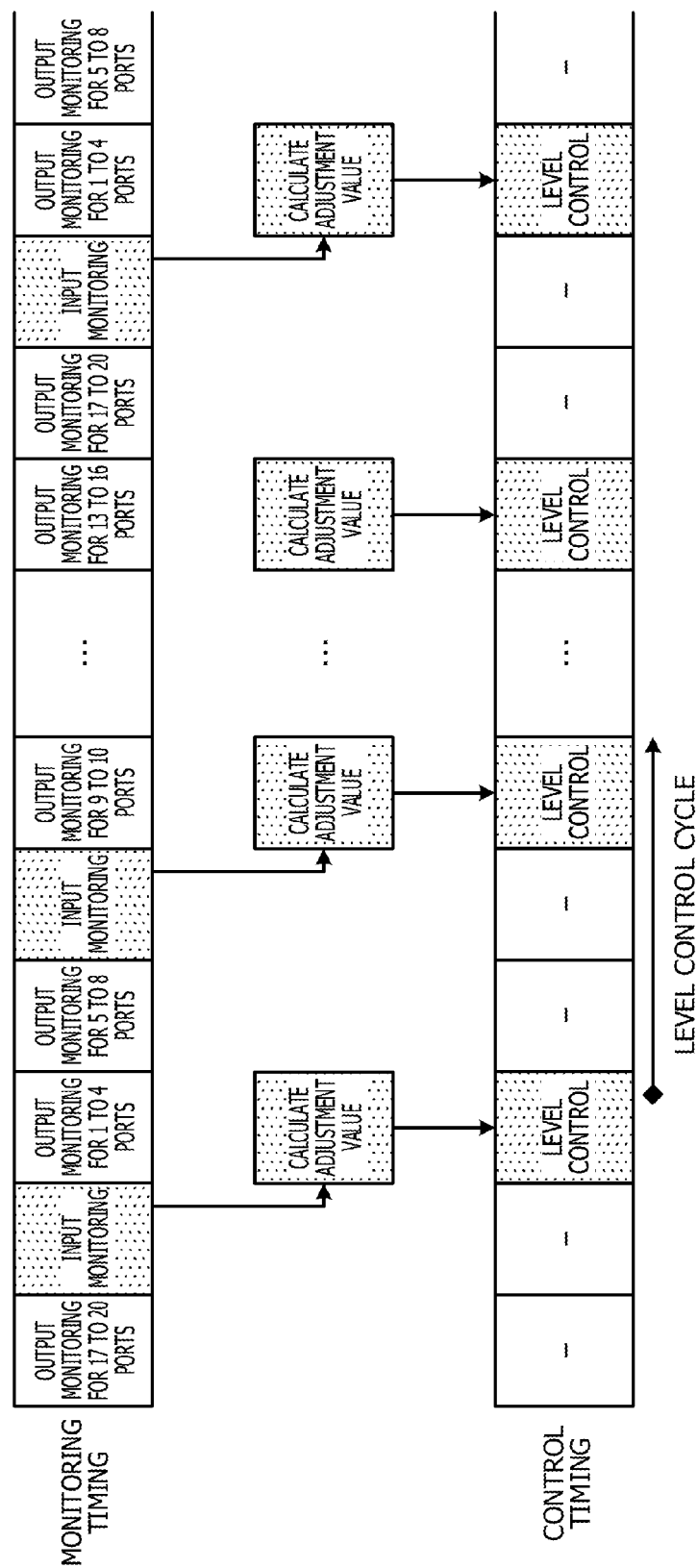
FIG. 3 illustrates exemplary monitoring timing and control timing.

The CPU 18 controls the entire OXC 2. The CPU 18 includes a detecting unit 21, a first calculating unit 22, a second calculating unit 23, a third calculating unit 24, and a setting unit 25. FIG. 3 illustrates exemplary control timing and monitoring timing. Monitoring timing is such that, for example, the output of the "1" to "4" output ports 11B, the output of the "5" to "8" output ports 11B, the output of the "9" to "12" output ports 11B, the output of the "13" to "16" output ports 11B, and the output of the "17" to "20" output ports 11B are sequentially monitored. The order of monitoring performed by the output monitor may be changed as appropriate.

The CPU 18 determines whether or not it is the timing for control. If it is the timing for control, the CPU 18 exerts switching control on the OPTSW 13 so that the optical signal on the input port 11A side is output. The control timing may occur at every certain cycle. For example, when the CPU 18 detects an input monitor value at the control timing, the CPU 18 exerts level control for the WSS 11. If it is the timing for control, the OPTSW 13 performs switching so as to output the optical signal which passes through the input port 11A and which is transmitted from the first optical branching unit 14, to the input monitor 16A of the OCM 16. If it is not the timing for control, the OPTSW 13 performs switching so as to output an optical signal for the output ports 11B which is transmitted from each coupler 12, to the output monitor 16B in the OCM 16. The control timing illustrated in FIG. 3 occurs after every two times for output monitoring. The control timing may occur after every two times for output monitoring, and the number of periods may be changed as appropriate.

When the detecting unit 21 detects an input monitor value from the input monitor 16A, the detecting unit 21 stores the input monitor value in the input value memory 17A. When the detecting unit 21 detects an output monitor value from the output monitor 16B, the detecting unit 21 stores the output monitor value in the output value memory 17B.

When the detecting unit 21 detects an input monitor value, the first calculating unit 22 calculates an optical loss value based on the current input monitor value, the latest output monitor values, and the current adjustment value for the ATT 11C. The current input monitor value is a current value detected by the input monitor 16A. The latest output monitor values are output monitor values for the "0" to "20" output ports 11B which are detected just before the current input monitor value is detected, among the output monitor values stored in the output value memory 17B. The current adjustment value is an adjustment value which is currently set to the ATT 11C and which is among the adjustment values stored in the adjustment value memory 17E.

The first calculating unit 22 calculates an optical loss value by using an expression, the current input monitor value—the latest output monitor values—the current adjustment value. The optical loss value is an optical loss value produced when a signal passes through the ATT 11C. The first calculating unit 22 stores the calculated optical loss value in the loss value memory 17C.

The second calculating unit 23 calculates a virtual output monitor value based on the current input monitor value, and the current adjustment value and the optimal optical-loss value for the ATT 11C. The optimal optical-loss value is, for example, an average of optical loss values within a certain cycle among optical loss values which are stored in the loss value memory 17C. For example, when the OXC 2 is started, a small number of optical loss value samples are stored in the loss value memory 17C. Therefore, a certain initial optimal optical-loss value may be set. The second calculating unit 23 calculates a virtual output monitor value by using an expression, the current input monitor value–the optimal optical-loss value–the current adjustment value. The virtual output monitor value is a predicted output monitor value for the WSS 11. The second calculating unit 23 stores the calculated virtual output monitor value in the virtual output value memory 17D.

The third calculating unit 24 calculates an adjustment value for the ATT 11C based on the virtual output monitor value, and the current adjustment value and a control target value for the ATT 11C. The third calculating unit 24 calculates an adjustment value by using an expression, the current adjustment value—(the control target value—the virtual output monitor value). The control target value indicates a predetermined target output level for the ATT 11C of the WSS 11.

The setting unit 25 sets the adjustment value calculated by the third calculating unit 24, to the ATT 11C in the WSS 11. The WSS 11 adjusts the output level of an optical signal based on the adjustment value which is set by the setting unit 25. As a result, compatibility between feedback (FB) control and feed forward (FF) control is achieved in the WSS 11, whereby stable output may be attained.

Figure 4:
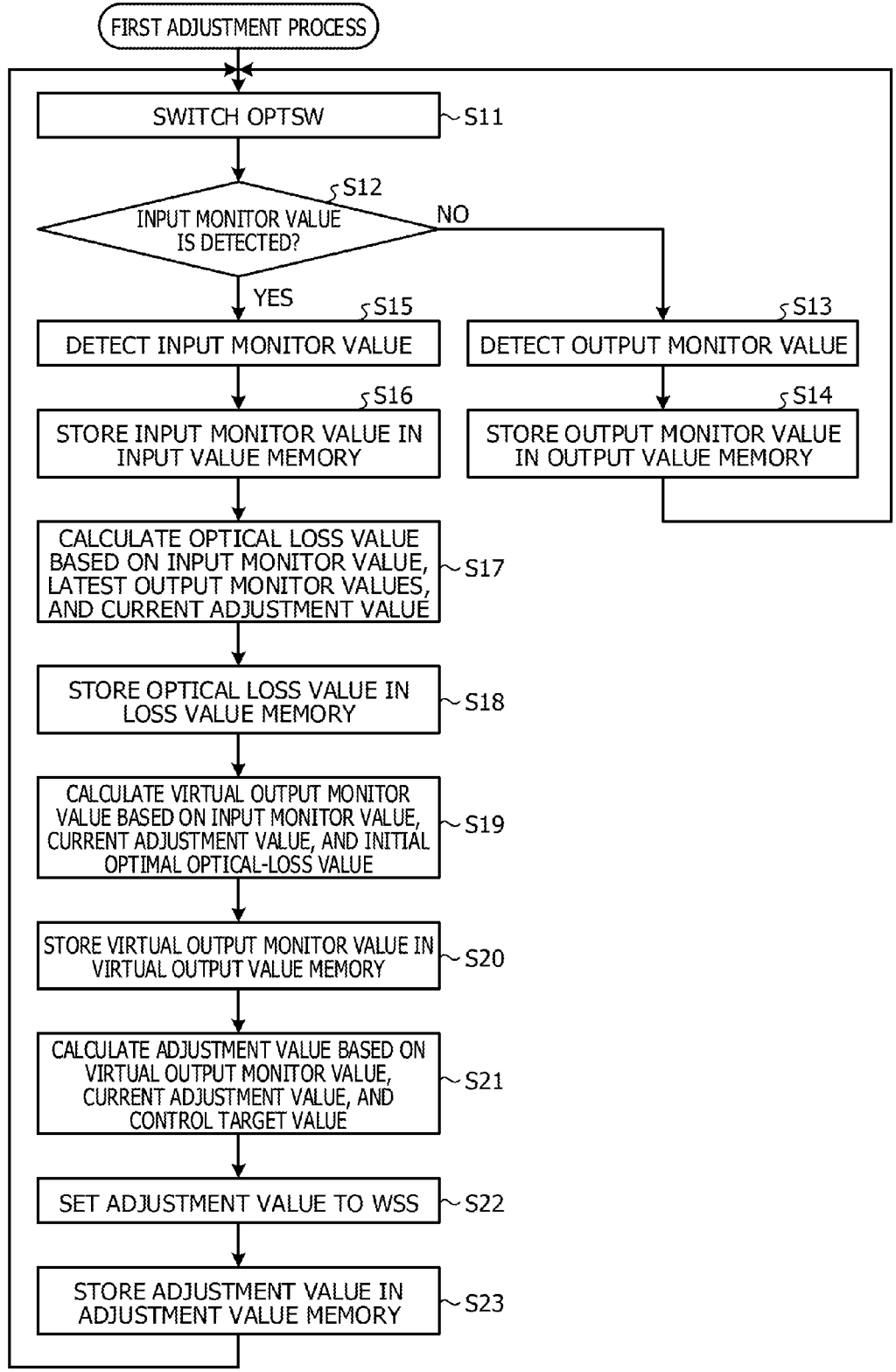
FIG. 4 illustrates exemplary operations performed by a central processing unit (CPU) in an OXC according to a first adjustment process.

FIG. 4 illustrates exemplary operations performed by the CPU in an OXC according to a first adjustment process. In the first adjustment process illustrated in FIG. 4, upon startup of an OXC 2, an adjustment value is calculated based on the monitor results from the input monitor 16A and the output monitor 16B, and the calculated adjustment value is set to the ATT 11C in the WSS 11.

In FIG. 4, the CPU 18 switches the OPTSW 13 (operation S11). The operation of switching the OPTSW 13 may be, for example, an operation of switching between output of an optical signal on the input port 11A side to the input monitor 16A and output of an optical signal on the output ports 11B side to the output monitor 16B.

The detecting unit 21 in the CPU 18 determines whether or not an input monitor value is detected from the OCM 16 (operation S12). If the detecting unit 21 does not detect an input monitor value (NO in operation S12), the detecting unit 21 determines that an output monitor value has been detected, and detects the output monitor value from the output monitor 16B (operation S13). The detecting unit 21 stores the detected output monitor value in the output value memory 17B (operation S14), and the process proceeds to operation S11. The detecting unit 21 may sequentially measure output monitor values from all or some of the output ports 11B after startup of the OXC 2, and may store the output monitor values for all or some of the output ports 11B in the output value memory 17B.

If the detecting unit 21 detects an input monitor value (YES in operation S12), the detecting unit 21 detects the input monitor value from the input monitor 16A (operation S15), and stores the detected input monitor value in the input value memory 17A (operation S16). The first calculating unit 22 in the CPU 18 calculates an optical loss value based on the input monitor value, the latest output monitor values, and the current adjustment value (operation S17). The first calculating unit 22 stores the calculated optical loss value in the loss value memory 17C (operation S18).

The second calculating unit 23 in the CPU 18 calculates a virtual output monitor value based on the current input monitor value, the current adjustment value, and the initial optimal optical-loss value (operation S19). The initial optimal optical-loss value may be predetermined. The second calculating unit 23 stores the calculated virtual output monitor value in the virtual output value memory 17D (operation S20).

The third calculating unit 24 in the CPU 18 calculates an adjustment value for the ATT 11C based on the calculated virtual output monitor value, the current adjustment value, and the control target value (operation S21). The setting unit 25 in the CPU 18 sets the adjustment value calculated by the third calculating unit 24 to the ATT 11C in the WSS 11 (operation S22), and stores the adjustment value as the current adjustment value in the adjustment value memory 17E (operation S23). Then, the process proceeds to operation S11.

The CPU 18 which performs the first adjustment process illustrated in FIG. 4 calculates a virtual output monitor value for the WSS 11 based on the input monitor value, the current adjustment value, and the initial optimal optical-loss value after startup of an OXC 2. The CPU 18 calculates an adjustment value based on the virtual output monitor value, the current adjustment value, and the control target value, and sets the calculated adjustment value to the ATT 11C in the WSS 11. As a result, even upon startup of the OXC 2, the level control for the WSS 11 is performed at a timing at which an input monitor value is detected. Therefore, even when the number of output ports 11B and the number of monitoring points are increased, the control period for the level control may be reduced.

For example, the CPU 18 performs level control for the WSS 11 by using an input monitor value and the latest output monitor values at a timing at which the input monitor value is detected. As a result, the CPU 18 reduces the control period for the level control, and causes the optical level control to follow a change in the optical signal power on an optical fiber 3 at high speed. The CPU 18 may address long-term deterioration and output failure of the WSS 11.

Figure 5:
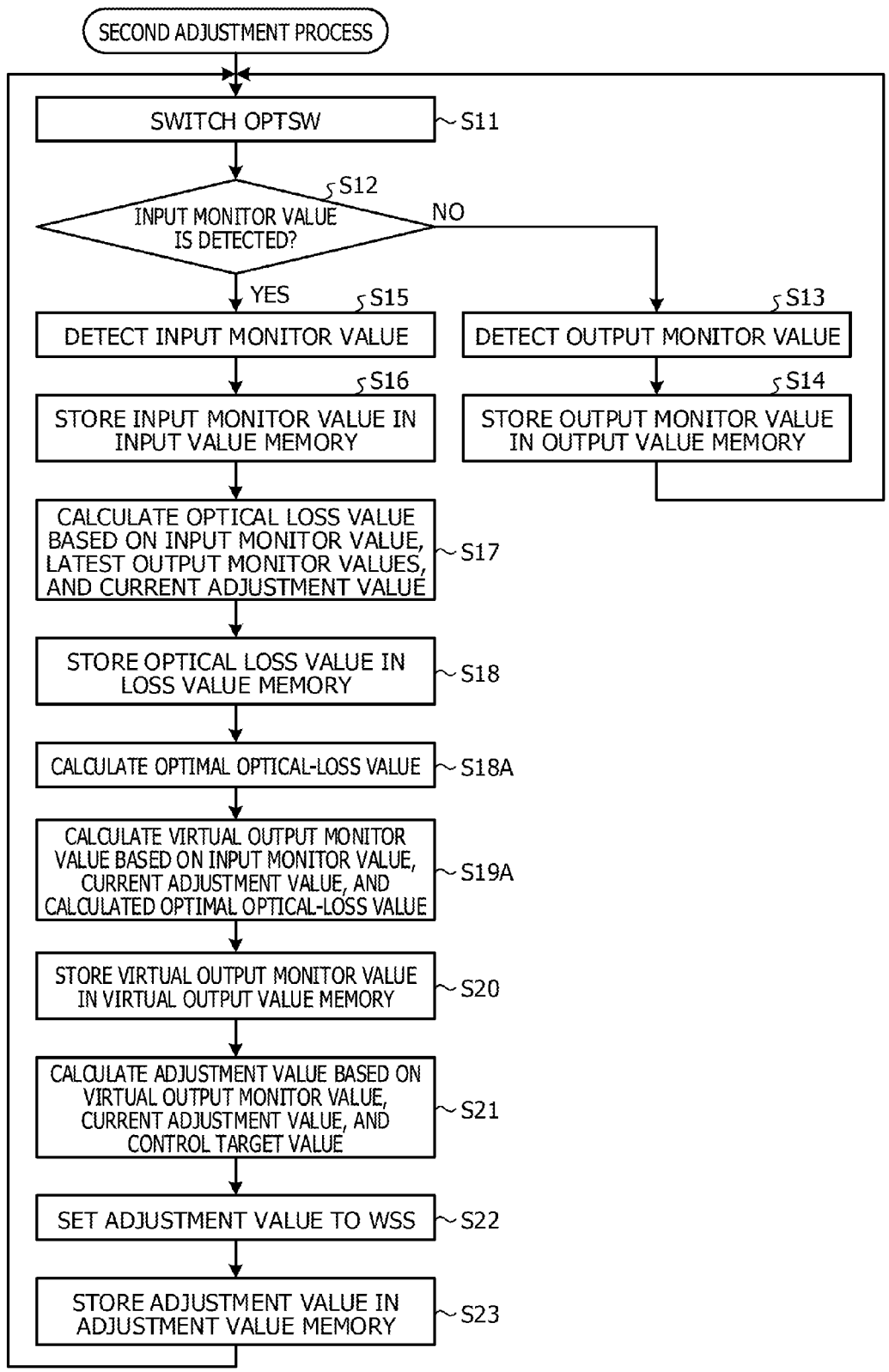
FIG. 5 illustrates exemplary operations performed by a CPU in an OXC according to a second adjustment process.

FIG. 5 illustrates exemplary operations performed by the CPU in an OXC according to a second adjustment process. In FIG. 5, operations which are substantially the same as or similar to those in the first adjustment process illustrated in FIG. 4 may be designated with identical reference characters, and repeated description may not be made or reduced. In the second adjustment process illustrated in FIG. 5, during operation, an adjustment value is calculated based on the monitor results from the input monitor 16A and the output monitor 16B, and the calculated adjustment value is set to the ATT 11C in the WSS 11.

In FIG. 5, the CPU 18 performs operations S11 to S18. The CPU 18 stores the optical loss value in the loss value memory 17C in operation S18, and then calculates an optimal optical-loss value based on the optical loss values within a certain cycle which are stored in the loss value memory 17C (operation S18A). The optimal optical-loss value is, for example, an average of optical loss values within a certain cycle among optical loss values which are stored in the loss value memory 17C.

The second calculating unit 23 in the CPU 18 calculates a virtual output monitor value based on the current input monitor value, the current adjustment value, and the calculated optimal optical-loss value (operation S19A). In order that the second calculating unit 23 stores the calculated virtual output monitor value in the virtual output value memory 17D, the process proceeds to operation S20. The CPU 18 performs operations S20 to S23.

The detection timings for an output monitor value are such that, for the 20, "1" to "20", output ports 11B, detection operations are sequentially performed, for example, for the "1" to "4" ports, the "5" to "8" ports, the "9" to "12" ports, the "13" to "16" ports, the "17" to "20" ports, the "1" to "4" ports, and so on. The detection timing for an input monitor value occurs after every certain cycle. Therefore, the detection timing for an input monitor value is inserted among the detection timings for an output monitor value which occur in the certain order. The CPU 18 controls the adjustment value for the ATT 11C in the WSS 11 at every detection timing for an input monitor value.

When the CPU 18 which performs the second adjustment process illustrated in FIG. 5 detects an input monitor value during operation, the CPU 18 calculates an optical loss value based on the input monitor value, the latest output monitor values, and the current adjustment value, and stores the calculated optical loss value in the loss value memory 17C. The CPU 18 calculates an optimal optical-loss value based on optical loss values within a certain cycle among optical loss values which are stored in the loss value memory 17C. As a result, while an effect produced by a change in input/output is reduced, the optical loss value for the WSS 11 may be obtained with high accuracy.

The CPU 18 calculates a virtual output monitor value based on an input monitor value, the current adjustment value, and the optimal optical-loss value, calculates an adjustment value based on the calculated virtual output monitor value, the current adjustment value, and the control target value, and sets the calculated adjustment value to the ATT 11C in the WSS 11. As a result, the level control for the WSS 11 is performed at a timing at which an input monitor value is detected. Therefore, even when the number of output ports 11B and the number of monitoring points are increased, the control period for the level control may be reduced.

The CPU 18 performs level control for the WSS 11 by using an input monitor value and the latest output monitor values at a timing at which the input monitor value is detected. As a result, the CPU 18 reduces the control period for the level control, and causes the optical level control to follow a change in the optical signal power on an optical fiber 3 at high speed. The CPU 18 may address long-term deterioration and output failure of the WSS 11.

When the CPU 18 detects an input monitor value, the CPU 18 calculates a virtual output monitor value based on the input monitor value, the latest output monitor values, and the current adjustment value, and calculates an adjustment value based on the calculated virtual output monitor value. The CPU 18 sets the calculated adjustment value to the ATT 11C in the WSS 11. As a result, the level control for the WSS 11 is performed at a timing at which an input monitor value is detected. Therefore, even when the number of output ports 11B and the number of monitoring points are increased, the control period for the level control may be reduced.

The CPU 18 performs level control for the WSS 11 by using an input monitor value and the latest output monitor values at a timing at which the input monitor value is detected. As a result, the CPU 18 reduces the control period for the level control, and causes the optical level control to follow a change in the optical signal power on an optical fiber 3 at high speed. The CPU 18 may address long-term deterioration and output failure of the WSS 11.

The CPU 18 calculates an optical loss value for the WSS 11 based on an input monitor value, the latest output monitor values, and the current adjustment value, and stores the calculated optical loss value in the loss value memory 17C. The CPU 18 calculates an optimal optical-loss value based on optical loss values within a certain cycle back from the present among optical loss values which are stored in the loss value memory 17C. As a result, while an effect produced by a change in input/output is reduced, the optical loss value for the WSS 11 may be obtained with high accuracy.

The CPU 18 calculates a virtual output monitor value based on an input monitor value, the optimal optical-loss value, and the current adjustment value. As a result, the CPU 18 predicts the virtual output monitor value as an output monitor value even when the CPU 18 does not obtain the output monitor values for all of the output ports 11B in real time.

The CPU 18 calculates an adjustment value based on the virtual output monitor value, the current adjustment value, and the control target value for the output ports 11B, and sets the calculated adjustment value to the WSS 11. As a result, the level control for the WSS 11 is performed at a timing at which an input monitor value is detected. Therefore, the control period may be reduced.

Figure 6:
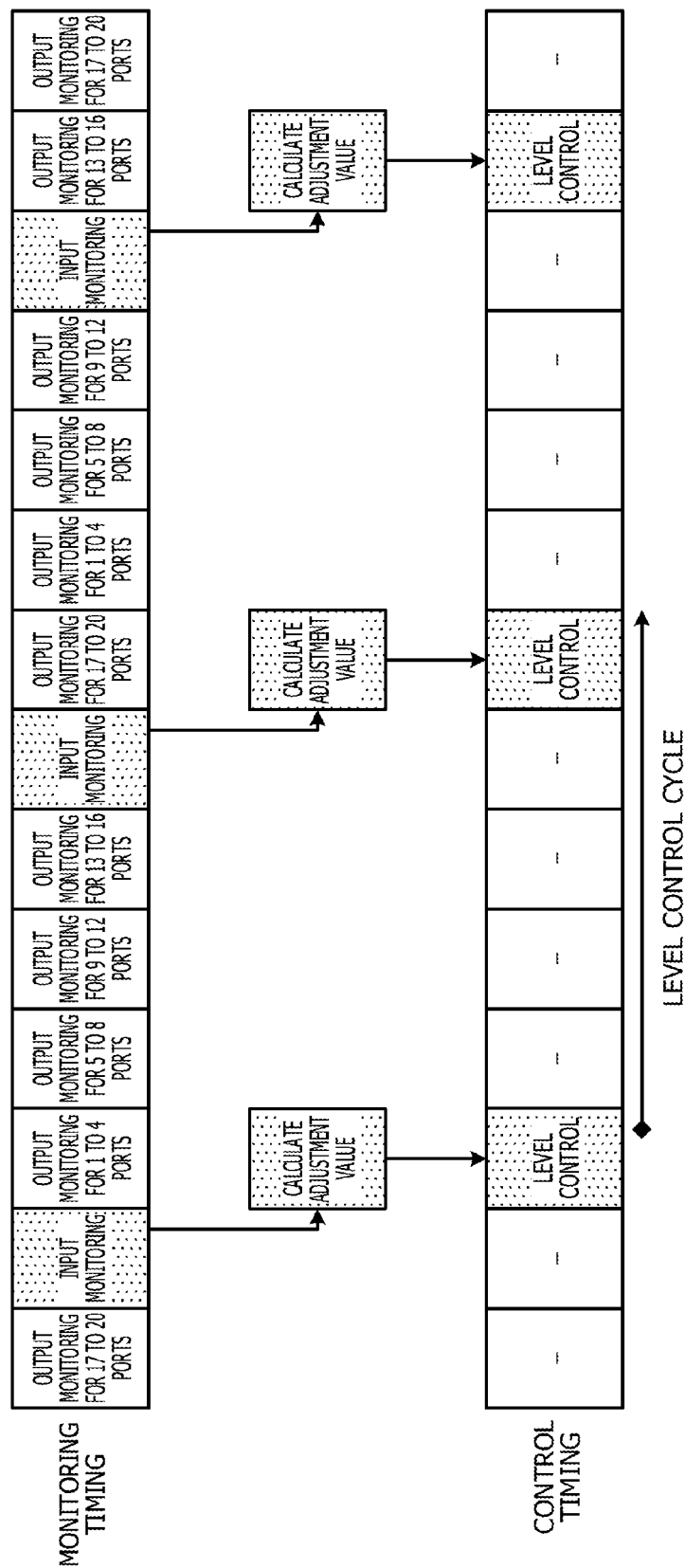
FIG. 6 illustrates exemplary monitoring timing and control timing.

The control timing may occur after every certain cycle, and the cycle may be changed as appropriate. FIG. 6 illustrates exemplary monitoring timing and control timing. The control timing illustrated in FIG. 3 occurs after every two times for output monitoring, for example, for "1" to "4" and "5" to "8". In contrast, the control timing illustrated in FIG. 6 occurs after every four times for output monitoring, for example, for "1" to "4", "5" to "8", "9" to "12", and "13" to "16". However, the cycle may be changed as appropriate. For example, the control timing may be independent of a certain cycle, and the control may be performed at a timing at which a failure occurs or at a timing at which an output monitor value does not match the control target value.

An optimal optical-loss value is calculated from the average of optical loss values within a certain cycle back from the present among optical loss values which are stored in the loss value memory 17C. For example, this is not limited to the average of optical loss values in a certain cycle, and, for example, the most frequent value, the median value, or the like among the optical loss values in a certain cycle may be set as an optimal optical-loss value.

An optimal optical-loss value is calculated by using a certain number of optical loss value samples within a certain cycle back from the present among optical loss value samples which are stored in the loss value memory 17C. However, the certain number of samples may be changed as appropriate.

The second calculating unit 23 may use the initial optimal optical-loss value to calculate a virtual output monitor value, and may manage, in advance, an initial optimal optical-loss value for each adjustment value. In this case, the second calculating unit 23 may use the initial optimal optical-loss value corresponding to the current adjustment value so as to calculate a virtual output monitor value.

After output monitor values for all of the output ports 11B are stored in the output value memory 17B, whether or not an input monitor value is detected is determined. If an input monitor value is detected, the level control is performed. This control method may be changed as appropriate.

All or some of the components of each illustrated unit may be functionally or physically distributed or integrated in any unit in accordance with various types of load, use conditions, and the like.

All or some of various functions performed in each apparatus may be executed by using a CPU (or a microcomputer, such as a micro processing unit (MPU) or a micro controller unit (MCU)). All or some of various functions may be executed by using programs analyzed and executed by a CPU (or a microcomputer, such as an MPU or an MCU), or by using hardware using wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus comprising:
a wavelength selecting switch, including an input port and an output port having more ports than the input port, configured to perform an adjustment of a level of an optical signal which is output from the input port to the output port;
a first monitor configured to monitor the level of the optical signal at the input port unit; a second monitor configured to monitor the level of the optical signal at the output port unit; and
a controller configured to control the wavelength selecting switch, the first monitor, and the second monitor,
wherein the controller is configured to:
calculate a virtual output value for the output port unit based on a first monitor result from the first monitoring unit, a second monitor result from the second monitoring unit, and a current adjustment value for the adjustment function;
calculate a new adjustment value for the adjustment based on the virtual output value; and
set the new adjustment value to the adjustment.

2. The optical transmission apparatus according to claim 1, wherein the virtual output value is calculated in accordance with a timing at which the first monitor result is obtained.

3. The optical transmission apparatus according to claim 1, wherein the controller is configured to: calculate one or more optical loss values for the adjustment based on the first monitor result, the second monitor result, and the current adjustment value; and calculate the virtual output value based on the first monitor result, an optimal optical-loss value obtained based on the one or more optical loss values, and the current adjustment value.

4. The optical transmission apparatus according to claim 3, wherein the controller calculates the new adjustment value based on the virtual output value, the current adjustment value, and a target value.

5. The optical transmission apparatus according to claim 3, wherein the controller sequentially stores the one or more optical loss values, and calculates the optimal optical-loss value based on the one or more optical loss values stored sequentially in a specific cycle.

6. The optical transmission apparatus according to claim 5, wherein the optimal optical-loss value is an average of the at least one optical loss value in the specific cycle.

7. A level adjusting method comprising:
adjusting, based on a first adjustment value, a level of an optical signal output from an input port to an output port unit having more ports than the input port, the input port unit and the output port unit being included in a wavelength selecting switch;
monitoring the level of the optical signal at the input port and obtaining a first monitor result;
monitoring the level of the optical signal at the output port and obtaining a second monitor result;
calculating a virtual output value for the output port based on the first monitor result, the second monitor result, and the first adjustment value;
calculating a second adjustment value based on the virtual output value; and
setting the second adjustment value as the first adjustment value.

8. The level adjusting method according to claim 7, wherein the virtual output value is calculated in accordance with a timing at which the first monitor result is obtained.

9. The level adjusting method according to claim 7, further comprising,
calculating one or more optical loss values for the adjustment based on the first monitor result, the second monitor result, and the current adjustment value, wherein the virtual output value is calculated based on the first monitor result, an optimal optical-loss value obtained based on the one or more optical loss values, and the current adjustment value.

10. The level adjusting method according to claim 9, wherein the new adjustment value is calculated based on the virtual output value, the current adjustment value, and a target value.

11. The level adjusting method according to claim 9, further comprising,
storing sequentially the one or more optical loss values, wherein the optimal optical-loss value is calculated based on the one or more optical loss values stored sequentially in a specific cycle.

12. The level adjusting method according to claim 11, wherein the optimal optical-loss value is an average of the at least one optical loss value in the specific cycle.

* * * * *